(12) United States Patent
Li

(10) Patent No.: US 8,469,408 B2
(45) Date of Patent: Jun. 25, 2013

(54) COVER MECHANISM FOR COVERING AN OPENING OF A HOUSING

(75) Inventor: Chen-Yu Li, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 394 days.

(21) Appl. No.: 12/647,549

(22) Filed: Dec. 28, 2009

(65) Prior Publication Data
US 2010/0327716 A1 Dec. 30, 2010

(30) Foreign Application Priority Data

Jun. 25, 2009 (TW) .............................. 98121349 A

(51) Int. Cl.
*E05C 9/10* (2006.01)
*E05C 1/12* (2006.01)

(52) U.S. Cl.
USPC ........... 292/37; 292/34; 292/36; 292/DIG. 11

(58) Field of Classification Search
USPC .............. 292/3, 8, 32, 24, 25, 27, 29, 31, 33, 292/34, 37, 40, 42, 95, 96, 98, 100, 101, 292/103, 106, 116–118, 120, 137, 138, 140, 292/143, 145, 147, 150, 151, 156, 157, 159, 292/162, DIG. 8, DIG. 10, DIG. 11, DIG. 30, 292/DIG. 31, DIG. 34, DIG. 40, DIG. 55, 292/DIG. 59, DIG. 70; 206/710, 711
See application file for complete search history.

(56) References Cited

U.S. PATENT DOCUMENTS

| | | | | |
|---|---|---|---|---|
| 822,562 A * | 6/1906 | Tucker | ............................ | 292/37 |
| 956,759 A * | 5/1910 | Clouse | ............................ | 292/37 |
| 995,519 A * | 6/1911 | Bellis | .............................. | 292/36 |
| 1,025,923 A * | 5/1912 | Perry | .............................. | 292/37 |
| 1,125,626 A * | 1/1915 | Young et al. | ..................... | 292/37 |
| 1,154,235 A * | 9/1915 | Cobb | ............................... | 292/37 |
| 1,269,572 A * | 6/1918 | Allenbaugh | ..................... | 292/37 |
| 1,303,087 A * | 5/1919 | Lutz | ................................ | 292/5 |
| 1,643,365 A * | 9/1927 | Bell | ................................ | 292/37 |
| 1,906,318 A * | 5/1933 | Jensen | ............................. | 27/35 |
| 1,907,528 A * | 5/1933 | Evans | ............................. | 292/27 |
| 2,473,065 A * | 6/1949 | Miller | ............................ | 292/37 |
| 2,664,611 A * | 1/1954 | Shomber | ........................ | 24/635 |
| 3,884,515 A * | 5/1975 | Ashkenazi | ..................... | 292/34 |
| 4,754,715 A * | 7/1988 | Squires | ......................... | 109/59 T |
| 5,711,427 A * | 1/1998 | Nyseth | .......................... | 206/710 |
| 5,915,562 A * | 6/1999 | Nyseth et al. | ................. | 206/710 |
| 5,957,292 A * | 9/1999 | Mikkelsen et al. | ........... | 206/710 |
| 6,098,809 A * | 8/2000 | Okada et al. | ................... | 206/711 |
| 6,350,418 B1 * | 2/2002 | Venderpool et al. | .......... | 422/297 |

(Continued)

*Primary Examiner* — Carlos Lugo
*Assistant Examiner* — Alyson M Merlino
(74) *Attorney, Agent, or Firm* — Winston Hsu; Scott Margo

(57) ABSTRACT

A cover mechanism includes a covering whereon a circular hole is formed, and a button installed inside the circular hole. At least one track is formed on the button. The cover mechanism further includes at least one locking component. A first end of the locking component is disposed on the track in a movable manner, and a second end of the locking component is for inserting into a slot of a housing so as to lock the covering on the housing. When the button rotates in a first direction, the track drives the first end to move away from a center of the button so that the second end inserts into the slot. On the other hand, when the button rotates in a second direction, the track drives the first end to move close to the center of the button so that the second end separates from the slot.

11 Claims, 10 Drawing Sheets

U.S. PATENT DOCUMENTS

| | | | |
|---|---|---|---|
| 6,457,598 B1 * | 10/2002 | Hsieh et al. | 220/323 |
| 6,549,618 B1 * | 4/2003 | Grudzinski | 379/145 |
| 6,622,883 B1 * | 9/2003 | Wu et al. | 220/323 |
| 6,834,895 B2 * | 12/2004 | Lin | 292/34 |
| 6,984,097 B1 * | 1/2006 | Saeki et al. | 414/411 |
| 7,105,745 B2 * | 9/2006 | Drane et al. | 174/67 |
| 7,549,552 B2 * | 6/2009 | Hasegawa et al. | 220/323 |
| 2004/0040884 A1 * | 3/2004 | Pai et al. | 206/710 |

* cited by examiner

US 8,469,408 B2

COVER MECHANISM FOR COVERING AN OPENING OF A HOUSING

BACKGROUND OF THE INVENTION

1. Field of the Invention

The present invention relates to a cover mechanism for covering an opening of a housing, and more particularly, to a cover mechanism with waterproof function and without utilizing screws.

2. Description of the Prior Art

With the improved technology, structures of consumer electronic products become more complicated resulting in strict assembly requirement. Due to requirements of testing, a conventional cover mechanism of a notebook computer utilizes screws mainly. However, the screwing method not only increases labor hours and labor cost, but also causes assembly inconvenience. In addition, the screwing method makes the products heavier and the screws are loosened from the products easily after several times of assembly. The conventional notebook computer cannot have an expected waterproof effect as utilizing too many screws. Thus, design of a cover mechanism with an easy assembly structure and preferred waterproof function is an important issue in the mechanical industry.

SUMMARY OF THE INVENTION

The present invention provides a waterproof cover mechanism without screws for solving above drawbacks.

According to the claimed invention, a cover mechanism includes a covering whereon a circular hole is formed, the covering being for covering an opening of a housing, a button installed inside the circular hole, at least one track being formed on the button, and at least one locking component disposed on a side of the covering, a first end of the locking component being disposed on the track of the button in a movable manner, and a second end of the locking component being for inserting into an indentation of the housing so as to lock the covering on the housing. When the button rotates in a first direction, the track of the button drives the first end of the locking component to move away from a center of the button so that the second end of the locking component inserts into the indentation of the housing, and when the button rotates in a second direction opposite to the first direction, the track of the button drives the first end of the locking component to move close to the center of the button so that the second end of the locking component separates from the indentation of the housing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
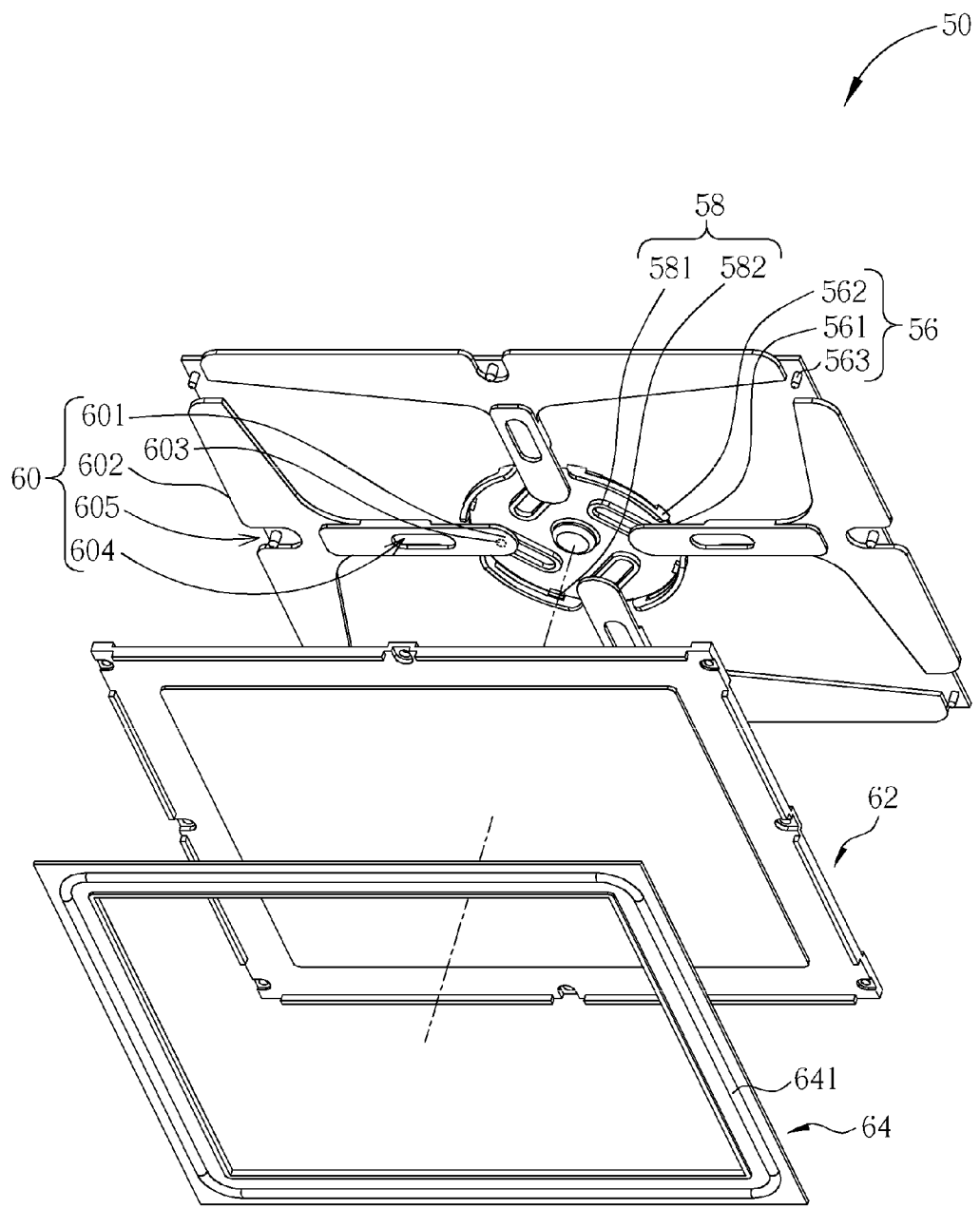
FIG. 1 and FIG. 2 are exploded diagrams of a cover mechanism in different views according to a preferred embodiment of the present invention.
Figure 2:
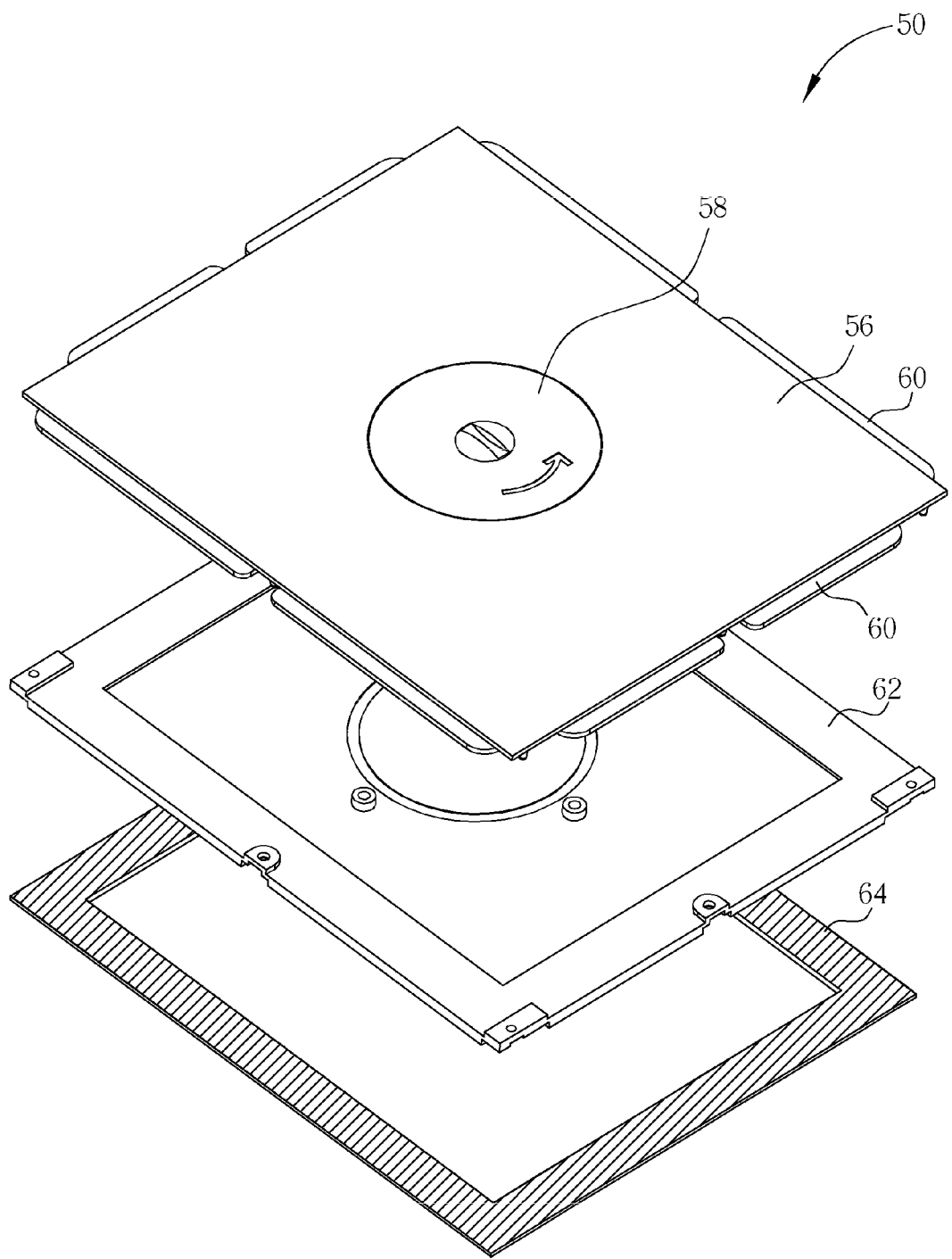
Figure 3:
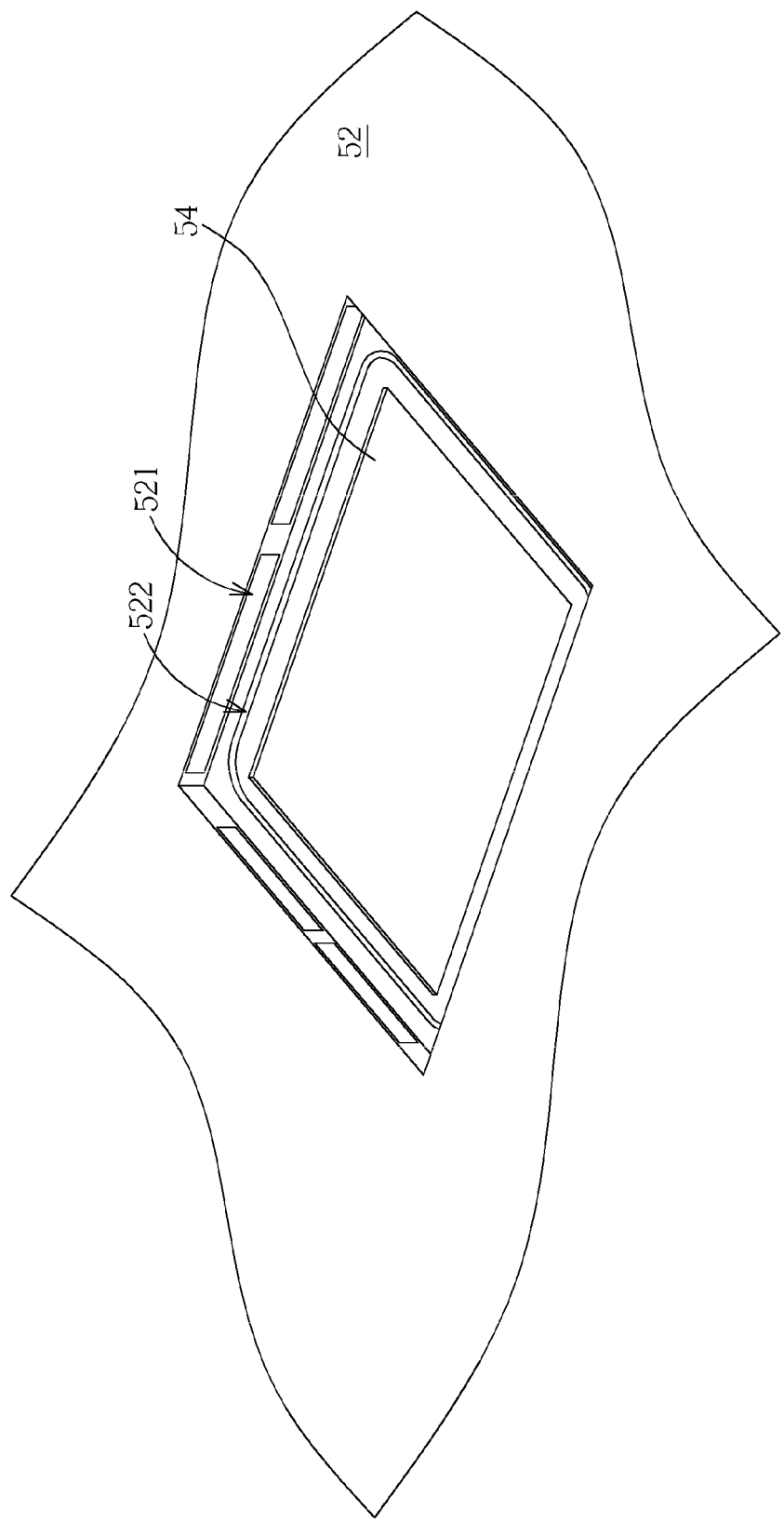
FIG. 3 is a diagram of a housing covered by the cover mechanism according to the preferred embodiment of the present invention.
Figure 4:
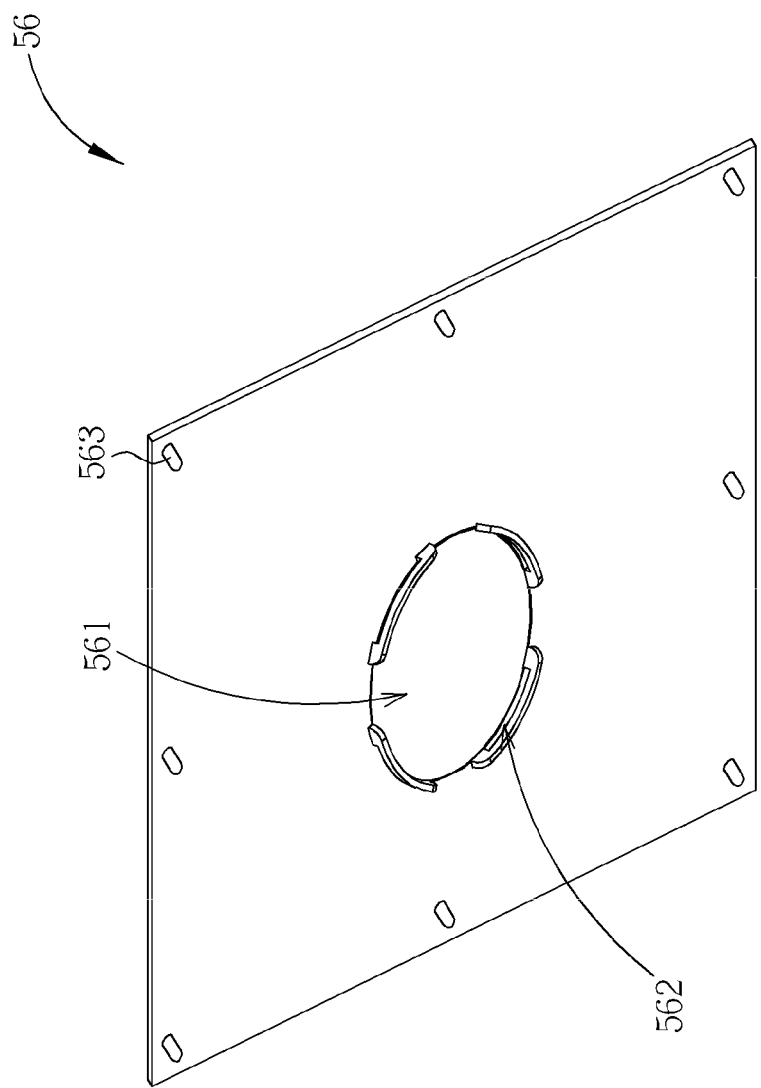
FIG. 4 is a diagram of a covering of the present invention.
Figure 5:
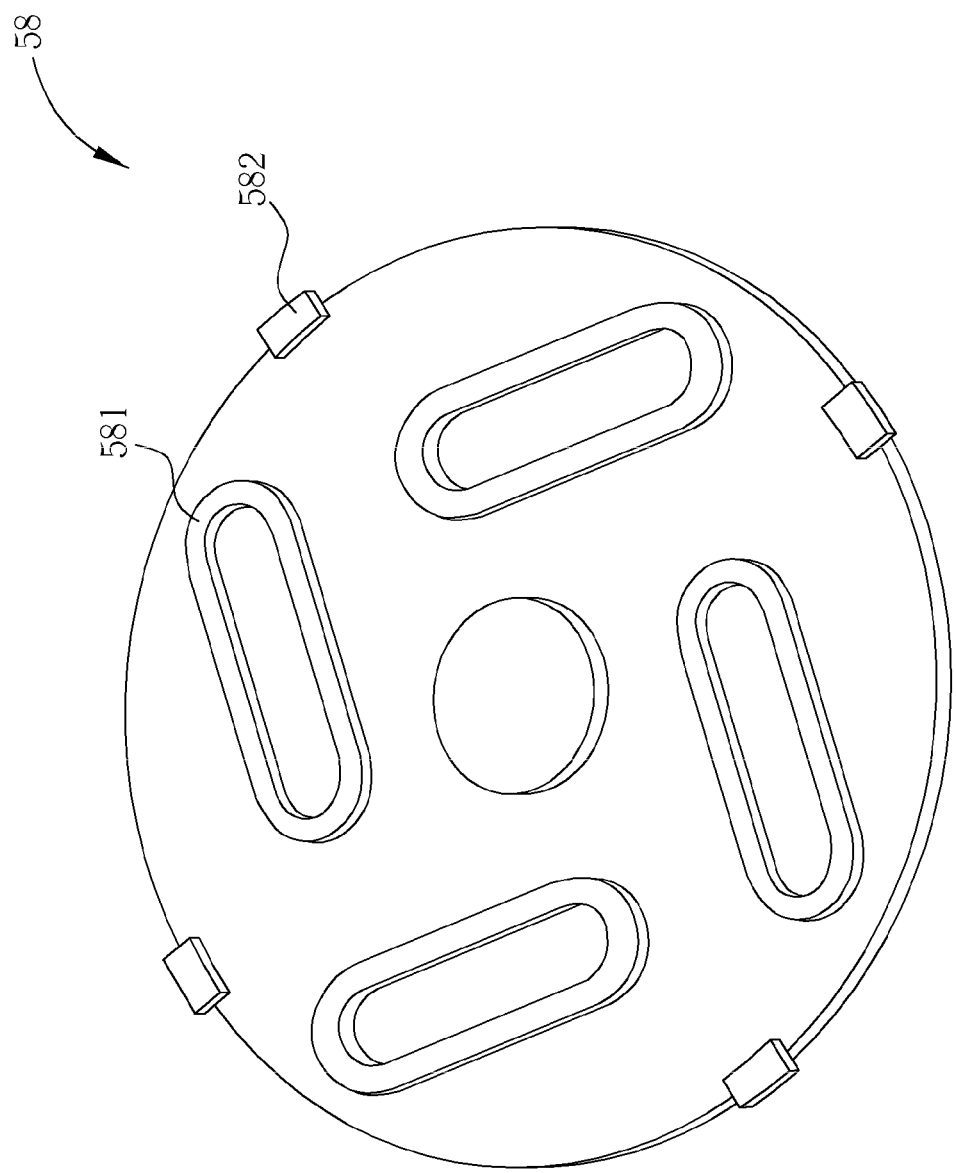
FIG. 5 is a diagram of a button of the present invention.

Please refer to FIG. 1 to FIG. 3. FIG. 1 and FIG. 2 are exploded diagrams of a cover mechanism 50 in different views according to a preferred embodiment of the present invention. FIG. 3 is a diagram of a housing 52 covered by the cover mechanism 50 according to the preferred embodiment of the present invention. The cover mechanism 50 is for covering an indented opening 54 of the housing 52 in a detachable manner. The cover mechanism 50 can be a door mechanism of a CPU or a door mechanism of a memory for an electronic device, such as a notebook computer, and the housing 52 can be a bottom cover of the notebook computer. The cover mechanism 50 includes a covering 56 for covering the opening 54 of the housing 52. The cover mechanism 50 further includes a button 58 installed on the covering 56. At least one track 581 is formed on the button 58. In this embodiment, four tracks 581 are formed on the button 58, which are strip tracks respectively. The adjacent tracks 581 are perpendicular to each other substantially in this embodiment. The number and arrangement of the track 581 formed on the button 58 are not limited to this embodiment and depend on design demands. Please refer to FIG. 4 and FIG. 5. FIG. 4 is a diagram of the covering 56 of the present invention. FIG. 5 is a diagram of the button 58 of the present invention. A circular hole 561 is formed on the covering 56. At least one protrusion 562 is disposed around the circular hole 561. At least one hook 582 is disposed on the button 58 and installed on a position corresponding to the protrusion 562 of the covering 56. The hook 582 is for wedging with the protrusion 562 so that the button 58 can be positioned on the covering 56. A route of the hook 582 moving inside the protrusion 562 corresponds to a route of the button 58 rotating relative to the covering 56. An angle that the button 58 is capable of rotating relative to the covering 56 can be adjusted by setting the route of the hook 582 moving inside the protrusion 562.

Figure 6:
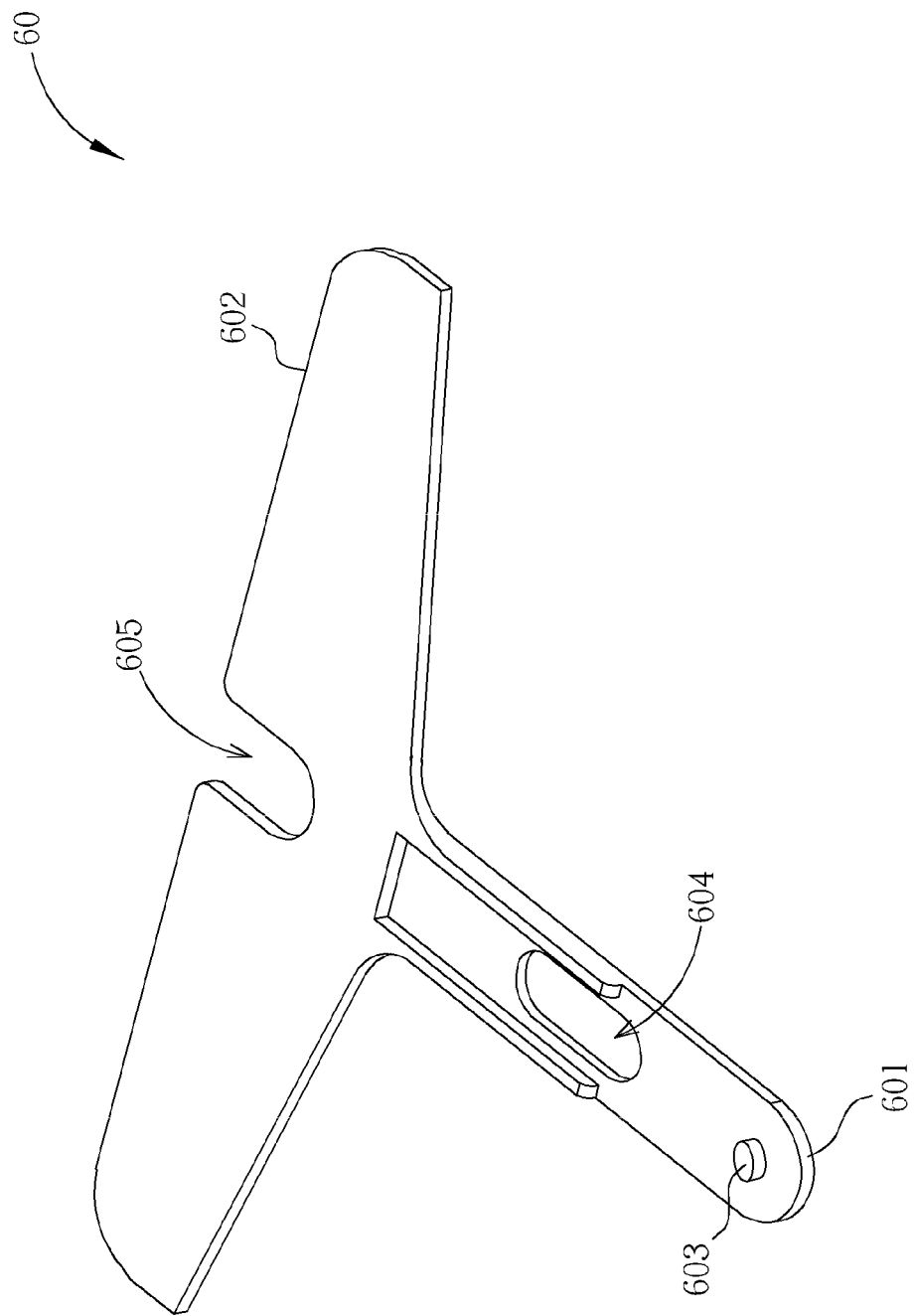
FIG. 6 is a diagram of a locking component of the present invention.
Figure 7:
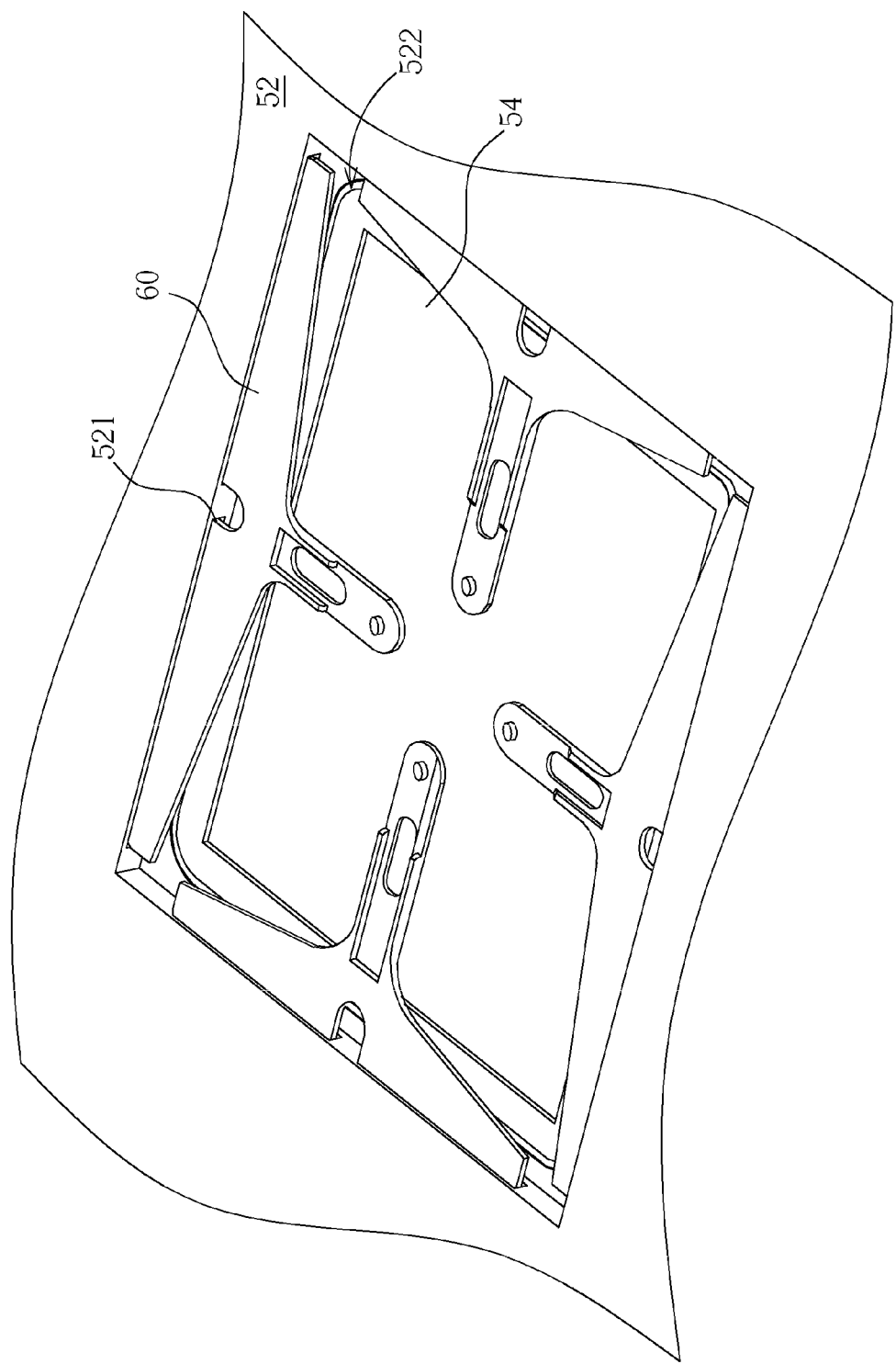
FIG. 7 is a diagram of a combination of the locking component and the housing of the present invention.

The cover mechanism 50 further includes at least one locking component 60 disposed on a side of the covering 56. The locking component 60 can be a T-shaped structure. In this embodiment, the cover mechanism 50 includes four locking components 60 for locking the covering 56 at four different directions. The number of the locking component 60 is not limited, and the locking components 60 can have different dimensions individually. For example, the locking components 60 disposed on a long edge of the opening 54 have larger sizes, and the locking components 60 disposed on a short edge of the opening 54 have smaller sizes, which depend on design demands. Please refer to FIG. 1 to FIG. 3, FIG. 6, and FIG. 7. FIG. 6 is a diagram of the locking component 60 of the present invention. FIG. 7 is a diagram of combination of the locking component 60 and the housing 52 of the present invention. A boss 603 is disposed on a first end 601 of the locking component 60 and installed on the track 581 of the button 58 in a movable manner, and a second end 602 of the locking component 60 is for inserting into an indentation 521 of the housing 52. The indentation 521 can be manufactured by T-shaped cutter, and a depth of the indentation 521 can be 4 mm preferably so as to prevent the bent locking component 60 from wedging inside the indentation 521 inaccurately.

Because the first end 601 of the locking component 60 connects with the button 58 and the button 58 is fixed on the covering 56, the covering 56 can be locked on the housing 52 when the second end 602 of the locking component 60 is inserted into the indentation 521 of the housing 52. In addition, a slot 604 and a notch 605 are formed on the locking component 60. The slot 604 can be a strip slot, and detailed description will be introduced later.

Figure 8:
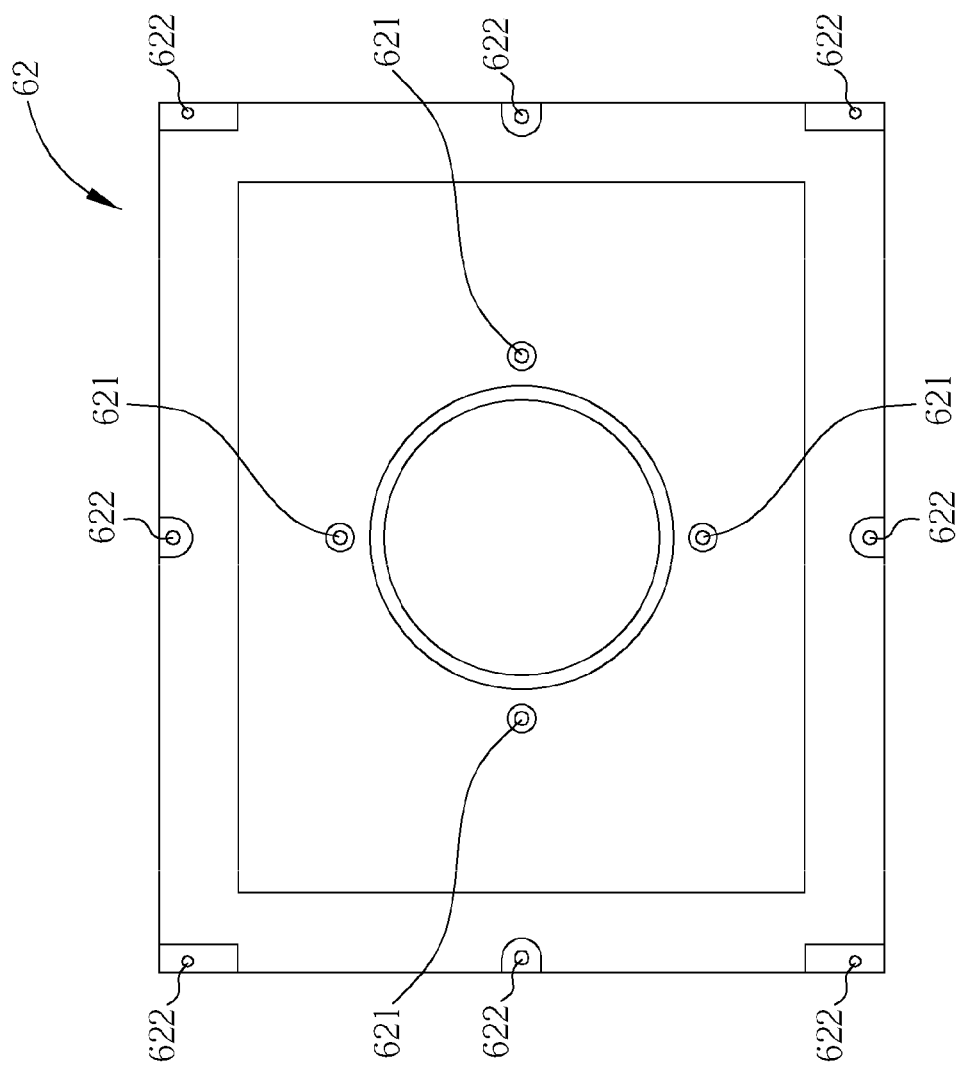
FIG. 8 is a diagram of a waterproof covering of the present invention.

The cover mechanism 50 further includes a waterproof covering 62 disposed on the side of the covering 56. The waterproof covering 62 is for waterproofing so as to prevent liquid from leaking into the housing 52 via the opening 54 of the housing 52. Please refer to FIG. 1, FIG. 2, and FIG. 8. FIG. 8 is a diagram of the waterproof covering 62 of the present invention. At least one guiding bar 621 is disposed on the waterproof covering 62 and installed inside the slot 604 of the locking component 60. In this embodiment, four guiding bars 621 are disposed on the waterproof covering 62 and are perpendicular to each other substantially. The guiding bar 621 is for guiding movement of the locking component 60, which means combination of the guiding bar 621 and the slot 604 is utilized to constrain the locking component 60 to move in straight when the button 58 rotates to drive the locking component 60, so that the locking component 60 can insert into the indentation 521 of the housing 52 precisely. In addition, the covering 56 and the waterproof covering 62 can be combined in a heat melt manner, which means a plurality of heat stakes 563 can be disposed on the covering 56. The notch 605 of the locking component 60 is for dodging the heat stake 563 so as to melt the heat stakes 563 of the covering 56 into a plurality of heat slots 622 of the waterproof covering 62 and to combine the covering 56 and the waterproof covering 62 in the heat melt manner.

In addition, the cover mechanism 50 further includes a waterproof strip structure 64 installed between the waterproof covering 62 and the housing 52 for waterproofing so as to prevent the liquid from leaking into the housing 52 via the opening 54 of the housing 52. The waterproof strip structure 64 can be made of rubber material. The waterproof strip structure 64 includes a rib 641. A groove 522 is formed on a side of the housing 52 supporting the waterproof strip structure 64, which can be manufactured by a cutter. The groove 522 is for wedging with the rib 641. A depth of the groove 522 can be 0.3 mm preferably. The rib 641 of the waterproof strip structure 64 can be wedged inside the groove 522 of the housing 52 in a tight fit manner so as to enhance waterproofing effect. The waterproof strip structure 64 and the waterproof covering 62 can be combined by glue.

Assembly sequence of the cover mechanism 50 is combining the button 58 and the covering 56 at first, and than combining the locking component 60 with the assembly of the button 58 and the covering 56. At this time, the assembly of the button 58, the covering 56, and the locking component 60 can provide a locking function at four directions. For providing waterproof function, the waterproof covering 62 and the waterproof strip structure 64 are combined with the assembly of the button 58, the covering 56, and the locking component 60. The assembly of the button 58, the covering 56, and the locking component 60 of the cover mechanism 50 provides a locking/releasing function, and the waterproof covering 62 and the waterproof strip structure 64 of the cover mechanism 50 provides a function of waterproofing in this system so as to conform to strict waterproof standards in the industrial specification and the military specification.

Figure 9:
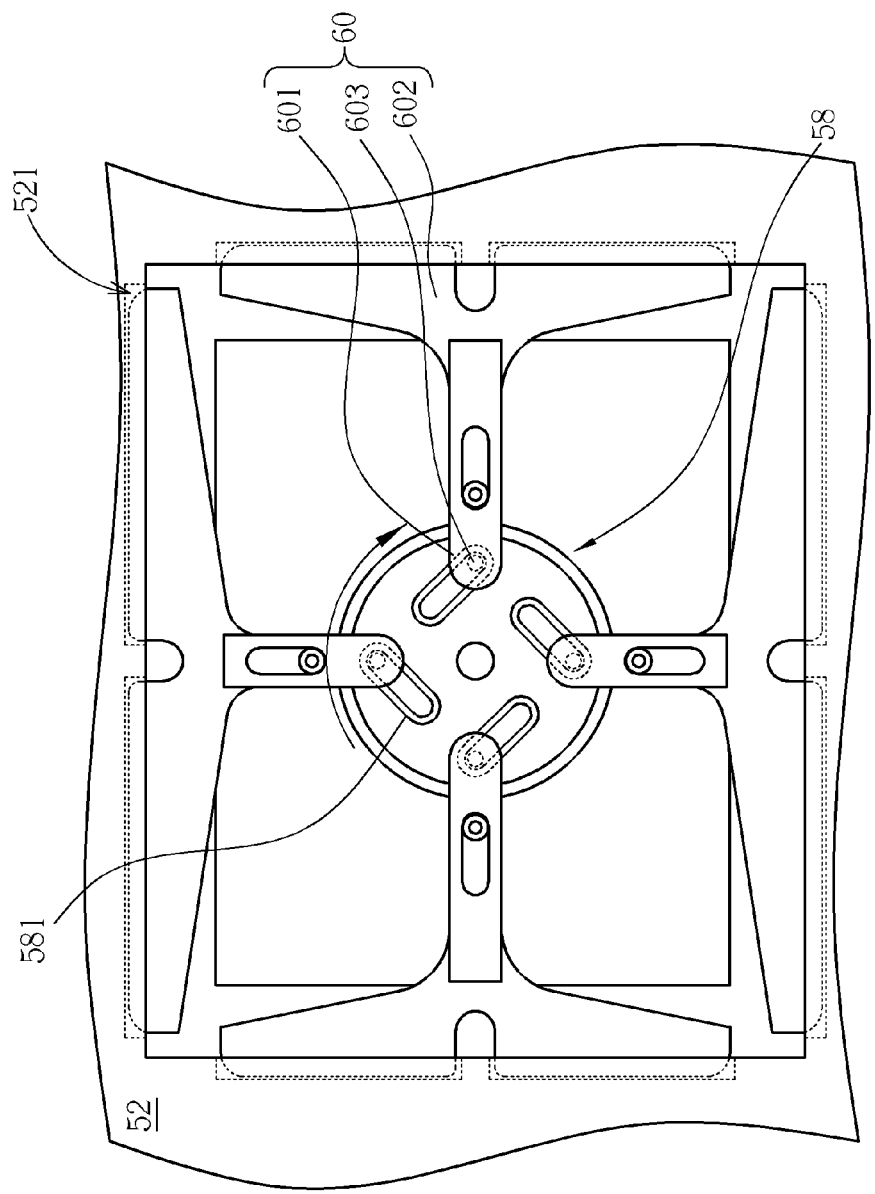
FIG. 9 and FIG. 10 are diagrams illustrating relative positions of the button and the locking component of the cover mechanism in different states of the present invention.
Figure 10:
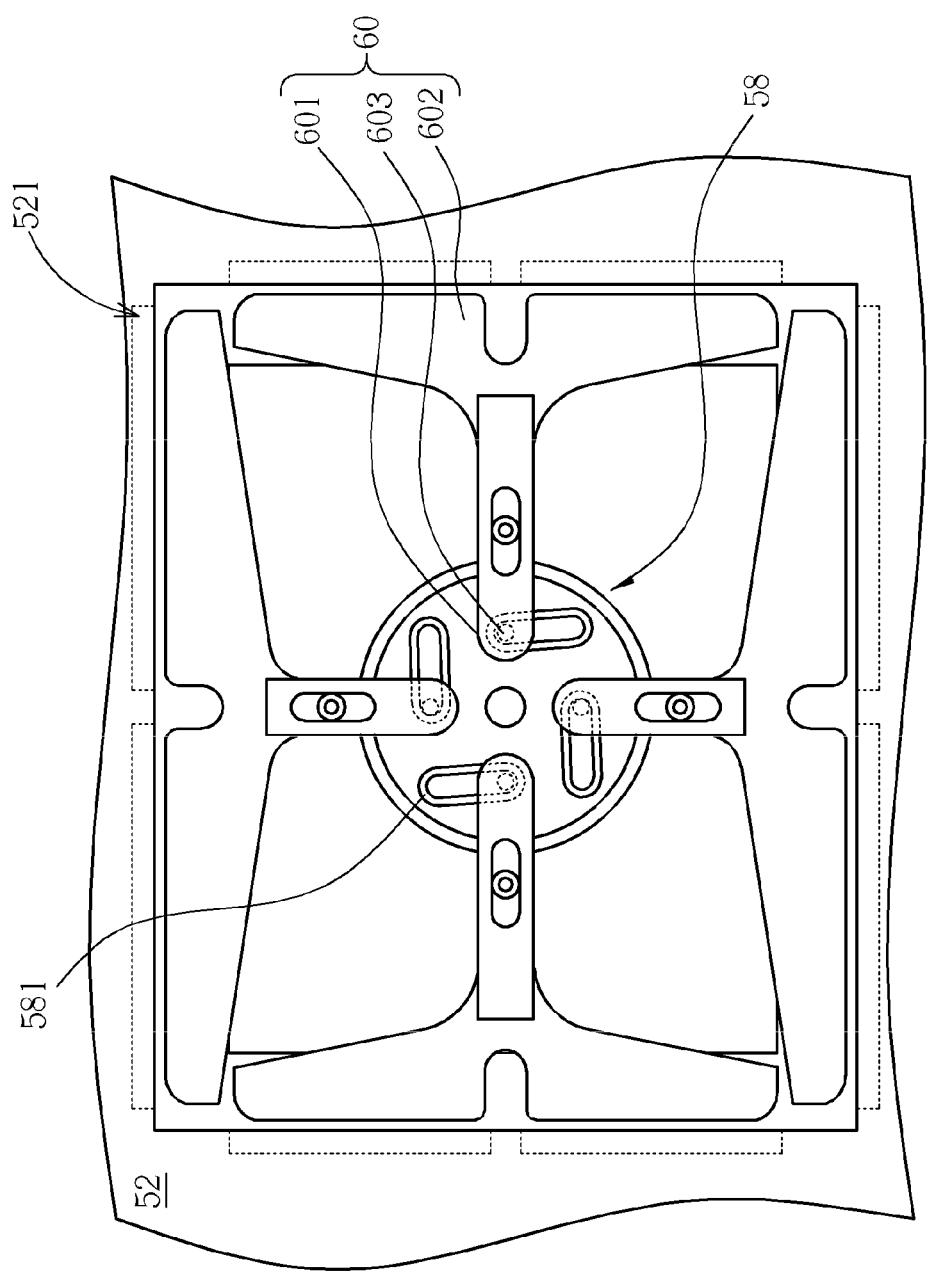

Detailed description of locking function and releasing function of the cover mechanism 50 is introduced herein. Please refer to FIG. 9 and FIG. 10. FIG. 9 and FIG. 10 are diagrams illustrating relative positions of the button 58 and the locking component 60 of the cover mechanism 50 in different states of the present invention. When the button 58 is not rotated and in an original state shown in FIG. 9, each locking component 60 is far away from a center of the button 58 and inserting into the indentation 521 of the housing 52. When the button 58 rotates at a clockwise direction as an arrow shown in FIG. 9 to a position shown in FIG. 10, the track 581 of the button 58 drives the boss 603 of the locking component 60 to move close to the center of the button 58, so that the second end 602 of the locking component 60 separates from the indentation 521 of the housing 52. At this time, a user can disassemble the cover mechanism 50 from the housing 52. On the other hand, when the button 58 rotates opposite to the clockwise direction as the arrow shown in FIG. 9 from the position shown in FIG. 10 to a position shown in FIG. 9, the track 581 of the button 58 drives the boss 603 of the locking component 60 to move away from the center of the button 58, so that the second end 602 of the locking component 60 inserts into the indentation 521 of the housing 52. Therefore, the cover mechanism 50 can be locked on the housing 52 tightly.

In conclusion, the cover mechanism 50 of the present invention utilizes a locking structure without screws, which means there is no need to use a screwdriver for assembling the waterproof covering with functions of four locking directions and the cover mechanism 50 can be locked and released by rotating the button 58, such as utilizing a coin to rotate the button 58, so that fabricating cost and labor hours can be reduced effectively and assembly convenience can be improved extensively. In addition, a method of utilizing rotary displacement can directly transform force from axial transmission to linear transmission at four directions so as to transmit the force to the four-direction locking components 60 simultaneously and to achieve multi-direction constraint by a simple rotary action. The present invention utilizes an overall engagement to achieve the level covering 56, so that the problem of height difference shown in outward appearance can be solved effectively. Besides, when the four-direction locking components 60 stretch outwardly, the waterproof strip structure 64 can be equally pressed in flat so as to prevent the liquid from leaking due to an unbalanced force distribution.

Comparing to the prior art, the locking mechanism of the present invention utilizes a mechanical design without screws that can effectively reduce the labor hours and assembly difficulty so as to reduce the fabricating cost and to improve assembly convenience for conforming to demands of commercial computers. The locking mechanism of the present invention has a preferred waterproof function so as to conform to the strict waterproof standards in the industrial specification and the military specification. In conclusion, the present invention provides the cover mechanism with the assembly convenience and the preferred waterproof function.

Those skilled in the art will readily observe that numerous modifications and alterations of the device and method may be made while retaining the teachings of the invention.

What is claimed is:

1. A cover mechanism comprising:
   a covering wherein a circular hole is formed, for covering an opening of a housing;
   a button installed inside the circular hole, a plurality of linear tracks being formed in the button, and adjacent linear tracks of the plurality of linear tracks being perpendicular to each other;
   a plurality of locking components disposed on sides of the covering, a first end of each locking component being disposed on a corresponding linear track of the plurality of linear tracks of the button in a movable manner, and a second end of each locking component for insertion into a corresponding indentation of the housing so as to lock the covering on the housing;

a waterproof covering, the plurality of locking components being sandwiched between the covering and the waterproof covering; and a waterproof strip structure disposed between the waterproof covering and the housing for waterproofing, the waterproof strip structure being equally pressed so as to prevent liquid from leaking into the housing when the plurality of locking components stretch outwardly to insert into the corresponding indentations of the housing;

wherein the plurality of linear tracks of the button drives the first end of each locking component to move away from a center of the button so that the second end of each locking component inserts into each indentation of the housing when the button rotates in a first direction, and the plurality of linear tracks of the button drives the first end of each locking component to move close to the center of the button so that the second end of each locking component separates from each indentation of the housing when the button rotates in a second direction opposite to the first direction.

2. The cover mechanism of claim 1, further comprising a plurality of protrusions fixed on the covering, and a plurality of hooks fixed on the button for engaging with the plurality of protrusions.

3. The cover mechanism of claim 1, wherein the plurality of linear tracks comprises four linear tracks disposed on the button such that adjacent tracks of the four linear tracks are perpendicular to each other.

4. The cover mechanism of claim 1, wherein a boss is disposed on the first end of each locking component and installed in the corresponding linear track of the button in a movable manner.

5. The cover mechanism of claim 1, wherein each locking component is a T-shaped structure.

6. The cover mechanism of claim 1, wherein a slot is formed in each locking component, and the cover mechanism further comprises a plurality of guiding bars disposed on the waterproof covering, wherein each guiding bar is installed inside each slot for guiding movement of the plurality of locking components.

7. The cover mechanism of claim 1, wherein the covering and the waterproof covering are combined in a heat melt manner.

8. The cover mechanism of claim 1, wherein the waterproof strip structure comprises a rib, a groove is formed on a side of the housing for supporting the waterproof strip structure, and the groove is for engaging with the rib.

9. The cover mechanism of claim 8, wherein the rib of the waterproof strip structure is wedged inside the groove of the housing in a tight fit manner.

10. The cover mechanism of claim 1, wherein the waterproof strip structure and the waterproof covering are combined by glue.

11. The cover mechanism of claim 1, wherein the waterproof strip structure is made of a rubber material.

* * * * *